Dec. 23, 1941.  H. H. HOUSTON  2,266,866
LIFT TRUCK
Filed May 18, 1940   2 Sheets-Sheet 2
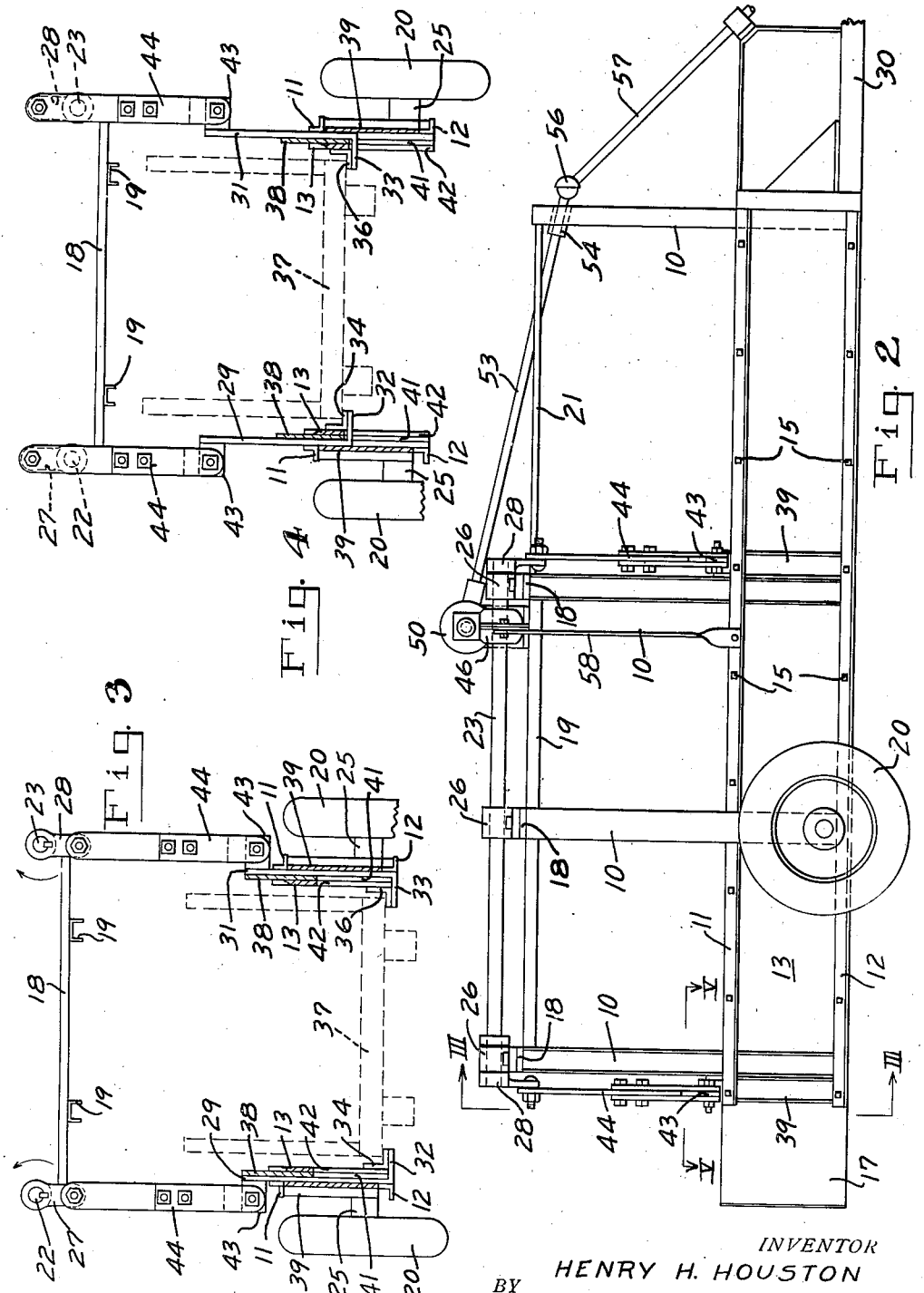
INVENTOR
HENRY H. HOUSTON
BY Johnston & Jennings
ATTORNEYS Patented Dec. 23, 1941

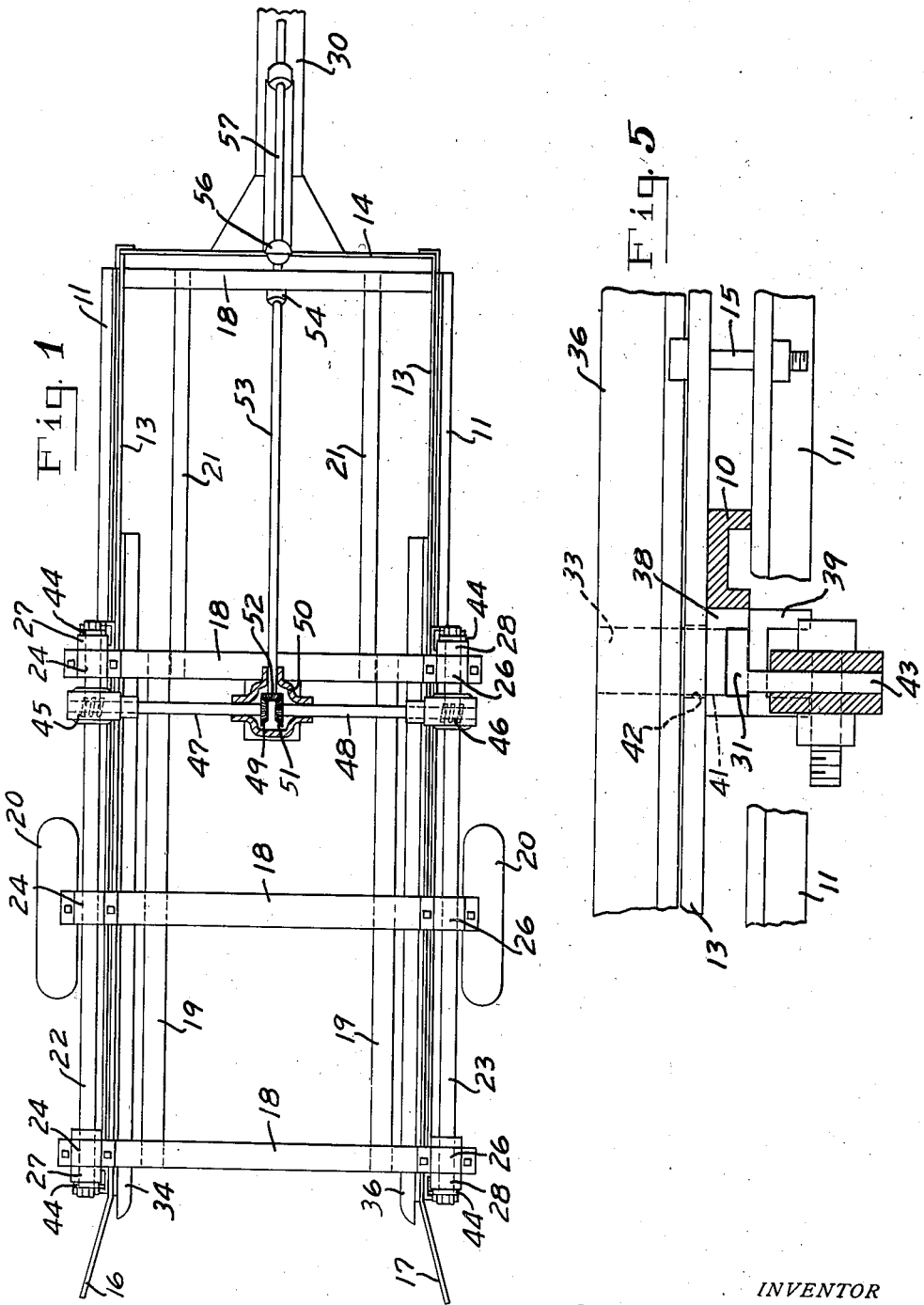

2,266,866

UNITED STATES PATENT OFFICE 2,266,866

LIFT TRUCK

Henry H. Houston, Montgomery, Ala., assignor to W. S. Foshee, Montgomery, Ala.

Application May 18, 1940, Serial No. 335,895

5 Claims. (Cl. 214—75)

This invention relates to lift trucks, and particularly to the trailer type which shall be capable of being loaded and unloaded without delaying the motor vehicle to which it is attached. Among the objects of my invention is to provide a truck of the character designated which shall embody power operated crank shafts for lifting the load, and means which are self-locking in all positions for operating the crank shafts, and in which the load when in extreme lowered and raised positions exerts a minimum of torsional strain on the crank shafts.

A further object of my invention is to provide a lifting truck of the trailer type, with means to apply a lifting force from an outside power source, and to provide lifting means on the truck so disposed as to afford a maximum of load space.

A further object of my invention is the provision of a lifting truck wherein the centers of gravity of the various parts of the truck itself and of the load to be carried are relatively low, thereby enabling the truck to round sharp curves at high speeds and to be operated over irregular terrain without danger of overturning.

A still further object of my invention is to provide a loading truck of the character described which shall be simple in design and economical of manufacture, and which shall be capable of rapid and efficient operation.

Briefly, my invention comprises a rectangular frame, open at one end and made preferably of upright structural steel frame members and other structural members extending along the sides and joined to the upright members. The upright members, which extend well above the load to be carried, are joined together at the top by transverse structural steel members. The transverse members in turn have joined thereto longitudinal structural members to add rigidity and provide a strong frame open at one end so as to straddle a load. Stub axles are mounted on the frame intermediate its ends to receive wheels for supporting the frame. Preferably only a single pair of wheels is employed, and the truck is hauled by a tractor or other suitable vehicle having power takeoff means. Lifting members are mounted in suitable guides in the side frames and are raised by means of cranks mounted on the ends of longitudinally extending parallel shafts carried at the upper ends of the upright members. The crank shafts are rotated by means of worm gears, and power is supplied preferably from the tractor which hauls the vehicle. The apparatus is designed so that the crank arms extend substantially straight down when the lifting elements are in their load engaging position, and are substantially straight up when in carrying position. Torsional strain on the shafts is thus minimized at points of greatest possible shock.

These and other features of my invention are illustrated in the accompanying drawings forming a part of this application, in which:

Fig. 1 is a plan view of a truck constructed in accordance with my invention;

Fig. 2 is a side elevation;

Fig. 3 is a sectional view looking in the direction of the arrows III—III in Fig. 2, with certain parts omitted and showing the lifting members in lowered position;

Fig. 4 is a view similar to Fig. 3 showing the lifting members raised; and

Fig. 5 is a detail sectional view taken along the line V—V of Fig. 2.

Referring to the drawings for a better understanding of my invention, my improved lifting truck comprises a frame embodying a plurality of upright structural steel members 10. Angle bars 11 and 12 are welded to the structural steel members 10 along the sides, at the bottom, and intermediate their ends. Joined to the upright structural members 10, preferably by welding, on the inside of the frame is a plate 13 which extends the full length of the truck and across the front at 14. The plate 13 is joined to the angles 11 and 12 by suitably spaced bolts 15. At the rear of the truck the plate is flared outwardly at 16 and 17 to aid in guiding the truck to straddle a load. At the top the structural members 10 are joined together by transverse structural members 18, and the transverse members 18 are joined together by longitudinally extending members 19 toward the rear of the truck, and by longitudinally extending members 21 toward the front.

The entire structure is supported preferably by a single pair of wheels 20 mounted on stub axles 25 intermediate the ends of the frame. The truck is hauled from place to place by a tongue 30 which is rigidly attached to the front of the frame and is adapted to be connected to a tractor or truck, not shown.

Extending longitudinally of the frame on opposite sides are crank shafts 22 and 23 which are mounted to rotate in bearings 24 and 26 mounted on top of the transverse members 18. Cranks 27 are mounted on the shaft 22, and cranks 28 on the shaft 23. It will be noted that cranks 27 and 28 overhang the ends of their respective shafts. The advantage in this structure is that the shafts 22 and 23 may be driven always in one direction, thus obviating the necessity of providing the power takeoff with a reversing mechanism.

Mounted in the frame are lifting members 29 and 31, which terminate at the bottom in inturned feet 32 and 33. Mounted on the feet 32 and 33, and extending longitudinally of the frame are angles 34 and 36 respectively, which are adapted to engage a load, indicated by the dotted outline 37. The lift members 29 are mounted in guides shown in detail in Fig. 5, comprising an inner channel member 38 and an outer channel member 39, with its web bearing against the lifting member, as shown. The lower end of the channel member 38 is slotted, as shown at 41, in Figs. 3 and 4, to permit the feet 32 and 33 to move vertically. The plate 13 is provided with similar slots 42 opposite the slots 41. At their upper ends, the lifting members 29 are provided with bracket arms 43 which are connected by means of links 44 to the cranks 27 and 28.

The shaft 22 is driven through a worm gear 45 and the shaft 23 through a worm gear 46 from cross shafts 47 and 48 having bevelled gears 49 and 51 on the ends thereof mounted in the gear case 50. The bevelled gears 49 and 51 are driven by a bevelled gear 52 mounted on the end of a longitudinally extending shaft 53. The shaft 53 is mounted in a bearing 54 supported from the forward transverse member 18 and is connected through a universal joint 56 to a downwardly inclined shaft 57 which is adapted to receive power from any suitable source, not shown. It is contemplated that the shaft 53 will be rotated in a single direction which will cause the casing of the worm gears 45 and 46 to tend to rotate about the shafts. I accordingly provide tension members 58, shown in Fig. 2, connected at their upper ends to the worm gear casing and at their lower ends to the angle 11 to hold the gear casing against rotation.

The operation of my improved lifting truck will be readily understood from the foregoing description. The load to be transported is placed in the loading rack 37 and the truck is backed astride, as shown in Fig. 3 of the drawings, with the lifting angles 34 and 36 in position to engage the loading rack. In this position, the crank arms 27 and 28 are straight down in their lowest positions, and the maximum lifting power is exerted on the loading rack with a minimum of torsional strain on the shafts 22 and 23. This is of importance in loosening a load where it happens to be stuck in the mud. As the shafts 22 and 23 continue to rotate, the load is raised to the position shown in Fig. 4, with the crank arms 27 and 28 in their highest positions. The worm gears 45 and 46 hold the shafts locked in whatever position they may be stopped. When in their upper positions, as shown in Fig. 4 of the drawings, the load can be transported with a minimum torsional strain on the shafts 22 and 23 and bending strain on the crank arms 27 and 28, which strain is ordinarily increased by shocks due to unevenness in the ground over which the load is being transported.

To lower the load, shafts 22 and 23 are operated from the power takeoff in the same direction as when it was lowered, as the crank arms 27 and 28 are capable of complete circular rotation because they are on the ends of the shafts 22 and 23.

From the foregoing it will be apparent that I have devised an improved lifting truck which is simple of design and operation, and which is adapted for handling heavy loads expeditiously. By the use of my invention, a single power operated truck can take the place of many ordinary hand trucks or buggies. The power plant, being detachable from the lifting truck, may be used for other purposes, my improved lifting truck being but an accessory to the standard auto truck or tractor. Also, it will be apparent that my improved truck, when equipped with proper size wheels and with brakes, may be used for long distance hauling. When put to such use, it will not be necessary for the truck to remain at the point of destination for any material length of time, as the unloading is accomplished in a few seconds.

While I have shown my invention in but one form, it will be obvious to those skilled in the art that it is not so limited, but is susceptible of various changes and modifications, without departing from the spirit thereof.

What I claim is:

1. A lifting truck comprising a wheel supported frame open at one end for straddling a load, shafts extending along opposite sides of the frame, worm gear means for rotating the shafts, vertically movable lift members on the sides of the frame to engage and lift a load, crank arms on the shafts and links connecting the crank arms to the lift members, the crank arms being capable of complete circular rotation and being substantially down when the lift members are in their lowest position, and substantially up when the lift members are in their raised position.

2. A lifting truck comprising a wheel supported frame open at one end for straddling a load, shafts extending along opposite sides of the frame, worm gear driving means for rotating the shafts, lift members on the sides of the frame to engage and lift a load, crank arms on the shafts capable of complete circular motion, links overhanging the ends of the shafts and connecting the crank arms to the lift members, and means connecting said lift members and said crank arms to translate rotary movement of said shafts into vertical movement of said lifting members and cause the crank arms to be in their uppermost position when the lift members are raised.

3. In a wheeled vehicle having a frame open at one end, upright members on each side of said frame, a pair of parallel driven shafts mounted near the upper end on said upright members, crank arms on the ends of each of said shafts capable of complete circular rotation, vertically movable load lifting members slidable in said frame, link connections between said cranks and lifting members, and means at the open end of said frame to guide the vehicle astride the load.

4. A loader comprising a wheeled vehicle having a substantially rectangular frame open at one end, upright supports on said frame, a plate extending peripherally around the closed sides of the frame at the lower part of said uprights, outwardly flaring sections on said plate at said open end of the frame adapted to form guide members for positioning a load within the frame, vertically movable lifting members slidable within said frame, driven shafts on the upper ends of said uprights, and crank arms on said shafts connected to said lifting members and adapted to raise said lifting members upon rotation of said shafts.

5. A lifting truck comprising spaced vertical structural steel members joined along the sides at the top and intermediate their ends by other structural members to form a rectangular frame which is open at one end, a steel plate forming the inner wall of the truck, the plate being flared outwardly at one end to form a guide to straddle a load, crank shafts mounted at the sides on top of the frame, crank arms on the crank shafts, lifting members connected to the crank arms, structural members forming guides for the lifting members, power means for driving the crank shafts, and worm gear means for transmitting the power to the crank shafts.

HENRY H. HOUSTON.